US008922669B2

(12) United States Patent
Mochimizo (10) Patent No.: US 8,922,669 B2
(45) Date of Patent: Dec. 30, 2014

(54) IMAGE PROCESSING APPARATUS HAVING A DISPLAY UNIT AND IMAGE PROCESSING PROGRAM FOR CONTROLLING THE DISPLAY UNIT

(75) Inventor: Noriaki Mochimizo, Kawasaki (JP)

(73) Assignee: Nikon Corporation, Tokyo (JP)

( * ) Notice: Subject to any disclaimer, the term of this patent is extended or adjusted under 35 U.S.C. 154(b) by 959 days.

(21) Appl. No.: 12/976,195

(22) Filed: Dec. 22, 2010

(65) Prior Publication Data

US 2011/0273589 A1   Nov. 10, 2011

(30) Foreign Application Priority Data

Jan. 4, 2010   (JP) ................................ 2010-000039

(51) Int. Cl.
| | |
|---|---|
| H04N 5/222 | (2006.01) |
| G03B 17/20 | (2006.01) |
| G03B 17/02 | (2006.01) |
| H04N 5/232 | (2006.01) |
| H04N 9/87 | (2006.01) |
| H04N 5/77 | (2006.01) |

(52) U.S. Cl.
CPC ............... *G03B 17/02* (2013.01); *G03B 17/20* (2013.01); *H04N 5/23248* (2013.01); *H04N 9/8715* (2013.01); *H04N 5/23245* (2013.01); *H04N 5/23293* (2013.01); *H04N 5/23219* (2013.01); *H04N 5/77* (2013.01)
USPC .................................. 348/222.1; 348/333.01

(58) Field of Classification Search
USPC ................................ 348/333.04, 222.1, 221.1
See application file for complete search history.

(56) References Cited

U.S. PATENT DOCUMENTS

| | | | | |
|---|---|---|---|---|
| 7,106,375 | B2 * | 9/2006 | Venturino et al. | 348/333.02 |
| 7,295,239 | B2 * | 11/2007 | Battles et al. | 348/333.02 |
| 7,312,827 | B2 * | 12/2007 | Cazier | 348/333.02 |
| 7,417,679 | B2 * | 8/2008 | Kuruma | 348/333.02 |
| 8,023,031 | B2 * | 9/2011 | Ikeda | 348/333.04 |
| 2002/0030754 | A1 * | 3/2002 | Sugimoto | 348/333.02 |
| 2004/0051804 | A1 * | 3/2004 | Veturino et al. | 348/333.12 |
| 2004/0174451 | A1 * | 9/2004 | Okazaki et al. | 348/333.02 |
| 2006/0055805 | A1 * | 3/2006 | Stockton et al. | 348/333.01 |

(Continued)

FOREIGN PATENT DOCUMENTS

| | | |
|---|---|---|
| CN | 101030016 A | 9/2007 |
| JP | A-2002-247410 | 8/2002 |

(Continued)

OTHER PUBLICATIONS

Office Action issued in Japanese Patent Application No. 2010-000039 dated May 22, 2012 (with translation).

(Continued)

*Primary Examiner* — Tuan Ho
*Assistant Examiner* — Selam Gebriel
(74) *Attorney, Agent, or Firm* — Oliff PLC (57) ABSTRACT

Provided are: an acquisition unit that acquires at least one of an image stored in a storage unit and an image recorded on a recording medium; an extraction unit that extracts a factor regarding the image that is acquired by the acquisition unit, the factor that does not satisfy a predetermined condition; and a display unit capable of displaying information on an image-capture state of the image based on the factor extracted by the extraction unit and capable of displaying information on a solution for allowing the factor to satisfy the predetermined condition.

13 Claims, 9 Drawing Sheets

(56) References Cited

U.S. PATENT DOCUMENTS

| | | |
|---|---|---|
| 2006/0103751 A1* | 5/2006 | Lee .......................... 348/333.02 |
| 2007/0058064 A1* | 3/2007 | Hara et al. ............... 348/333.01 |
| 2007/0153111 A1 | 7/2007 | Kato |
| 2007/0200945 A1* | 8/2007 | Inukai ...................... 348/333.02 |
| 2008/0079811 A1* | 4/2008 | Park et al. .................... 348/175 |
| 2008/0088710 A1* | 4/2008 | Iwamoto et al. ........... 348/220.1 |
| 2008/0158392 A1* | 7/2008 | Nikata .......................... 348/234 |
| 2010/0123815 A1* | 5/2010 | Yim et al. ................. 348/333.02 |
| 2012/0069210 A1* | 3/2012 | Miyata ...................... 348/222.1 |
| 2013/0083219 A1* | 4/2013 | Heo et al. ................... 348/231.6 |
| 2013/0194447 A1* | 8/2013 | Sudo et al. ................ 348/222.1 |

FOREIGN PATENT DOCUMENTS

| | | |
|---|---|---|
| JP | A-2004-128820 | 4/2004 |
| JP | A-2006-50233 | 2/2006 |
| JP | A-2007-184733 | 7/2007 |
| JP | A-2009-038657 | 2/2009 |

OTHER PUBLICATIONS

Jan. 17, 2012 Office Action issued in Japanese Patent Application No. 2010-000039 (with English translation).

Chinese Office Action issued Jun. 23, 2014 in Chinese Patent Application No. 201010621765.9 (with English translation).

* cited by examiner

IMAGE PROCESSING APPARATUS HAVING A DISPLAY UNIT AND IMAGE PROCESSING PROGRAM FOR CONTROLLING THE DISPLAY UNIT

CROSS-REFERENCE TO RELATED APPLICATIONS

The disclosure of the following priority application is herein incorporated by reference:

Japanese Patent Application No. 2010-000039 filed on Jan. 4, 2010.

TECHNICAL FIELD

The present invention relates to an image processing apparatus and an image processing program which perform an image display process.

BACKGROUND ART

There has been proposed a digital camera that extracts a current-state operation explanation from the manual data stored in the memory when help mode is selected, for example, when the help mode is selected during split aperture imaging, it extracts an item of how to use a check box used at the time of split aperture imaging, or when the help mode is selected during date setting, it extracts an explanation of how to use a spin box used at the time of setting a date, and displays the operation explanation on the display unit (for example, refer to Patent Literature 1).

CITATION LIST

Patent Literature

Patent Literature 1: Japanese Unexamined Patent Application Publication No. 2004-128820

SUMMARY OF INVENTION

Technical Problem

In the digital camera disclosed in JP-A-2004-128820, the operation explanation and the like are displayed on the display unit in the help mode (guide mode), so that a novice can understand an operation method of the digital camera and can operate the same. However, since the novice does not know items and setting values to actually set in order to capture a desired image, the novice may not know what to operate even if the novice can operate the digital camera. For example, since the novice does not know that it is necessary to lower ISO sensitivity in order to capture an image with little noise, even if the novice can perform an operation for changing the value of the ISO sensitivity, the novice may not know what to set in order to capture the image with little noise and therefore does not reach the step of changing the value of the ISO sensitivity.

It is an object of the present invention to provide an image processing apparatus and an image processing program capable of easily obtaining setting value information on a capturing condition for capturing a desired image.

Solution to Problem

An image processing device of the present invention comprises: an acquisition unit that acquires at least one of an image stored in a storage unit and an image recorded on a recording medium; an extraction unit that extracts a factor regarding the image that is acquired by the acquisition unit, the factor that does not satisfy a predetermined condition; and a display unit capable of displaying information on an image-rapture state of the image based on the factor extracted by the extraction unit and capable of displaying information on a solution for allowing the factor to satisfy the predetermined condition.

Moreover, an image processing program of the present invention is a program applied to an image processing program, which is applied to an image processing apparatus including a display unit and processing at least one of an image stored in a storage unit and an image recorded on a recording medium, comprising steps of: acquiring the image; extracting a factor regarding the acquired image, the factor that does not satisfy a predetermined condition; causing the display unit to display information on an image-capture state of the image based on the extracted factor; and causing the display unit to display information on a solution for allowing the factor to satisfy the predetermined condition.

Advantageous Effects of Invention

According to the image processing apparatus and the image processing program of the present invention, it is possible to easily obtain setting value information on a capturing condition for capturing a desired image.

DESCRIPTION OF EMBODIMENTS

Figure 1:
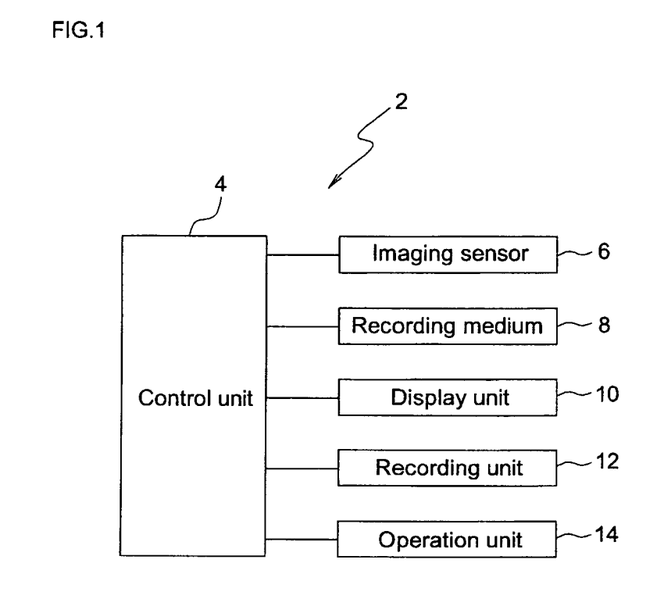
FIG. 1 is a block diagram illustrating a system configuration of a camera according to the embodiment.

Hereinafter, a camera as an image processing apparatus according to an embodiment of the present invention will be described with reference to the accompanying drawings. FIG. 1 is a block diagram illustrating the system configuration of a camera 2 according to the embodiment. As illustrated in FIG. 1, the camera 2 includes a control unit 4, an imaging sensor 6, a recording medium 8, a display unit 10, a recording unit 12, and an operation unit 14.

The control unit 4 includes a CPU and the like, and reads an image processing program from a memory (not shown) and the like, and executes the image processing program to execute overall control of each element of the camera 2. In the embodiment, the control unit 4 extracts a factor that does not satisfy a predetermined condition with respect to a display image displayed on the display unit 10, reads problems of the display image and solutions of the problems from problems of an image and solutions of the problems, which are recorded on the recording unit 12, based on the extracted factor, and displays the read problems and solutions on the display unit 10. It is noted that the image-related factor that does not satisfy the predetermined condition, the problems related to the image, and the solutions of the problem will be described later.

The imaging sensor 6 is constituted with a CCD, a CMOS or the like and images subject light obtained via a photographic lens (not shown) from an object. The recording medium 8 has portability, that is, is detachably mounted to a recording medium insertion port (not shown) provided in the camera 2. An image generated based on the imaging signal output from the imaging sensor 6 is recorded on the recording medium 8 together with other information on the image such as an image-capturing date, an aperture value or a shutter speed.

The display unit 10 displays a through image based on the imaging signal output from the imaging sensor 6, an image temporarily stored on a buffer memory (not shown) and the like, the image recorded on the recording medium 8, the information on the image recorded on the recording medium 8, and problems of the display image displayed on the display unit 10, for example. The recording unit 12 stores information on an imaging state of the image (described later), setting value information of a capturing condition under which a factor regarding the image satisfies a predetermined condition (described later), i.e., information on a problems of an image and a solution of the problem, the number of occasions on which a setting value of the factor regarding the image was changed in the past, and other similar information. The operation unit 14 is configured to include, for example, a power switch (not shown) for turning on and off the power of the camera 2, a shutter button (not shown) for instructing capturing or the like, a cross operation key (not shown) for selecting a menu item or the like or moving a cursor, and an OK (decision) button (not shown) for performing a selection decision operation for various selection items.

Figure 2:
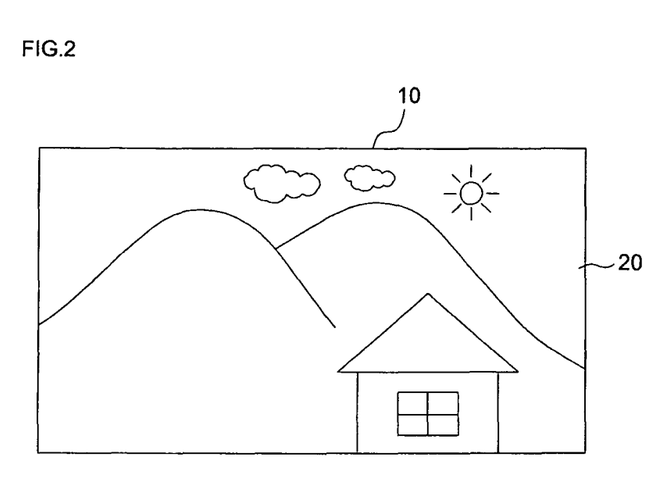
FIG. 2 is a diagram showing a display example of a display unit according to the embodiment.

In the camera 2 according to the embodiment, if a help mode is entered, factors (e.g., ISO sensitivity, shutter speed and the like) that do not satisfy a predetermined condition with respect to a display image (e.g., a display image 20 as illustrated in FIG. 2) displayed on the display unit 10 are extracted, the extracted factors are used to read problems of the display image 20 and solutions to the problems based on the problems (e.g., noise, colors, blur and the like) of images and solutions (e.g., ISO sensitivity, a shutter speed and the like) for the problems, which are recorded on the recording unit 12, and the read problems and solutions are displayed on the display unit 10. Consequently, it is possible to provide a user with the problems of the display image 20 and setting values of capturing conditions optimal for solving the problems.

For example, in relation to noise in the display image 20, the control unit 4 performs scene recognition with respect to the display image 20 and further acquires ISO sensitivity obtained when having imaged the display image 20. As a result of the scene recognition, when it is determined that the display image 20 is an image obtained by using a person as an object and the acquired ISO sensitivity, for example, is equal to or more than 400, the control unit 4 determines that the ISO sensitivity for the scene recognition in the display image 20 is a factor that does not satisfy the predetermined condition and a high level of noise is present in the display image 20 because the ISO sensitivity does not satisfy the predetermined condition. Then, based on scene recognition, when it is determined that the display image 20 is a landscape image and the acquired ISO sensitivity, for example, is smaller than 1600, the control unit 4 determines that the ISO sensitivity for the scene recognition in the display image 20 is a factor satisfying the predetermined condition and a low level of noise is present in the display image 20. That is, a low threshold value for ISO sensitivity that acknowledges a high level of noise is set in relation to an image of a scene in which noise is subjectively problematic, i.e., an image obtained by using a person as an object. A high threshold value for ISO sensitivity that acknowledges a high level of noise is set in relation to an image of a scene in which noise is not subjectively problematic, i.e., a landscape image. When it is determined that a high level of noise is present in the display image 20, the control unit 4 allows the display unit 10 to display information on the image-capture state of the display image 20 such as "Problem noise. How to reduce noise?", that is, it displays a problem (recorded on the recording unit 12) of the display image 20. Then, when the problem is selected by the user, the control unit 4 allows the display unit 10 to display setting value information of a capturing condition, that is, a solution (recorded on the recording unit 12) that is lowering the ISO sensitivity.

Furthermore, in relation to the color of the display image 20, the control unit 4 acquires a color temperature of the display image 20, for example, a white balance when the display image 20 has been imaged. Then, the control unit 4 calculates a difference between a color temperature (hereinafter, referred to as AWB color temperature) based on the white balance, which is set automatically if an auto white balance has been selected when the display image 20 is imaged, and a color temperature (hereinafter, referred to as WB color temperature) based on an actual white balance when the display image 20 has been imaged. When the calculated difference exceeds a threshold value, the control unit 4 determines that the white balance in the display image 20 is a factor that does not satisfy the predetermined condition, and that the color of the display image 20 is abnormal because the white balance does not satisfy the predetermined condition. In this case, the control unit 4 allows the display unit 10 to display a problem of the display image 20 such as "Difference in actual look and a color. What to do?". When the problem is selected by the user, the control unit 4 allows the display unit 10 to display a solution of setting white balance to auto white balance.

Furthermore, in relation to blurring (shaking phenomenon of an image due to object image shake) of the display image 20, the control unit 4 performs motion recognition with respect to an object and further acquires a shutter speed obtained when the display image 20 has been imaged. As a result of the motion recognition, when it is determined that the object is moving and the acquired shutter speed is equal to or less than a threshold value, the control unit 4 determines that the shutter speed in the display image 20 is a factor that does not satisfy the predetermined condition and the display image 20 is subjected to a high level of blurring because the shutter speed does not satisfy the predetermined condition. Then, when it is determined that the display image 20 is subjected to a high level of blurring (image shaking), the control unit 4 allows the display unit 10 to display a problem of the display image 20 such as "Problem blur (image shaking). How to remove blur?" When the problem is selected by the user, the control unit 4 allows the display unit 10 to display the solution of increasing the shutter speed.

Furthermore, in relation to the shaking (shaking phenomenon of an image due to camera shake) of the display image 20, the control unit 4 acquires the shutter speed obtained when the display image 20 has been imaged and further acquires a camera shake amount from a image stabilizing mechanism and the like provided in a photographic lens (not shown). When the acquired camera shake amount exceeds a threshold value and the shutter speed is equal to or less than a threshold value, the control unit 4 determines that the shutter speed in the display image 20 is a factor that does not satisfy the predetermined condition and the display image 20 is subjected to a high level of shaking because the shutter speed does not satisfy the predetermined condition. Then, when it is determined that the display image 20 is subjected to a high level of shaking, the control unit 4 allows the display unit 10 to display a problem of the display image 20 such as "Problem Shaking in the image. How to remove shaking?" When the problem is selected by the user, the control unit 4 allows the display unit 10 to display the solution of increasing the shutter speed. It is noted that the presence or absence of blur or shaking in the display image 20 may be determined based on a calculation result of a spatial frequency or a contrast value of the display image 20.

Furthermore, when the display image 20 is an image using a person as an object, which is determined as a result of performing the scene recognition with respect to the display image 20, in relation to the darkness of the face of the person in the display image 20, the control unit 4 performs face recognition with respect to the display image 20 and further acquires the contrast value of the display image 20. Then, the control unit 4 calculates a difference between the contrast value of a facial area recognized by the face recognition and a contrast value of an area other than the facial area. When the calculated difference exceeds a threshold value, the control unit 4 determines that a grayscale value in the display image 20 is a factor that does not satisfy the predetermined condition and the face of the person in the display image 20 is dark because the grayscale value does not satisfy the predetermined condition. Then, when it is determined that the face of the person in the display image 20 is dark, the control unit 4 allows the display unit 10 to display a problem of the display image 20 such as "Face is darkened and black due to blurring. What to do?" When the problem is selected by the user, the control unit 4 allows the display unit 10 to display the solution of correcting the grayscale value of the display image 20 as an image process for a captured image.

Furthermore, if re-imaging is possible, the control unit 4 allows the display unit 10 to display the solution "Face priority exposure mode (a capturing mode in which a face area is appropriately exposed)" as a recommendation to the user, or the solution "Perform capturing after adjusting a photometric area to a face area".

Furthermore, when the user wants to capture an image with a blurred background, the control unit 4 allows the display unit 10 to display a problem, for example, "What to do in order to blur a background?". When the problem is selected by the user, the control unit 4 acquires an aperture value or a focal length of a photographic lens (not shown). Then, in order to shallow the depth of field of the display image 20, the control unit 4 allows the display unit 10 to display the solution of opening a diaphragm or increasing the focal length. Meanwhile, when the user wants to capture an image having a stereoscopic effect (a sense of depth), the control unit 4 allows the display unit 10 to display a problem, for example, "What to do in order to capture an image having a stereoscopic effect?". When the problem is selected by the user, the control unit 4 acquires an aperture value or a focal length of a photographic lens (not shown). Then, in order to shallow the depth of field of the display image 20, the control unit 4 allows the display unit 10 to display a solution of closing a diaphragm or reducing the focal length.

Furthermore, the control unit 4 acquires the presence or absence of emitted illumination light for capturing on an object of the display image 20, and determines that the presence or absence of the emitted illumination light for capturing in the display image 20 is a factor that does not satisfy the predetermined condition, and that the overall color of the display image 20 is problematic because the presence or absence of the emitted illumination light for capturing does not satisfy the predetermined condition. Then, the control unit 4 allows the display unit 10 to display the solution of emitting or not emitting the illumination light for capturing. As described above, the control unit 4 extracts factors that do not satisfy the predetermined condition in the display image 20 and allows the display unit 10 to display information on the image-capture state of the display image 20 based on the extracted factors, and setting value information on a capturing condition in which the extracted factors satisfy the predetermined condition.

Figure 3:
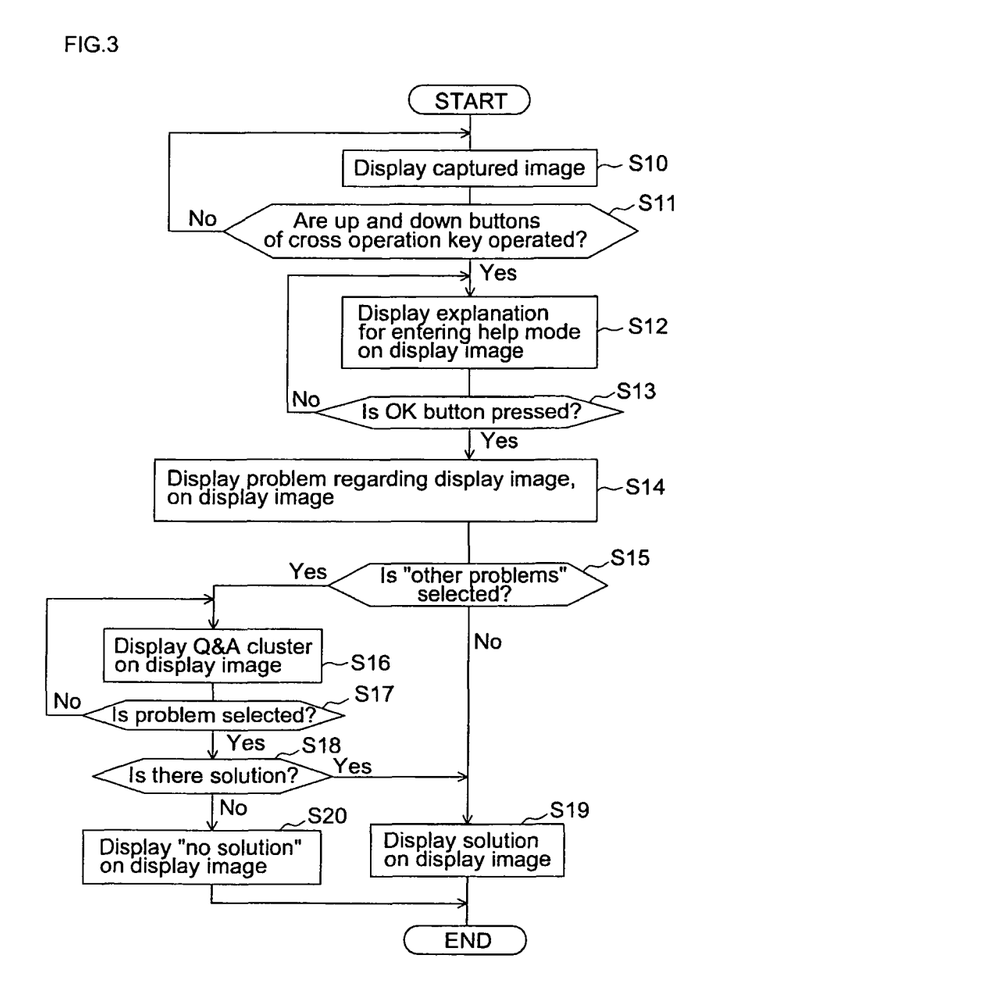
FIG. 3 is a flowchart explaining an operation when a camera according to the embodiment has entered a help mode.

Hereinafter, the operation when the camera 2 according to the embodiment has entered the help mode will be described with reference to the flowchart illustrated in FIG. 3.

Figure 4:
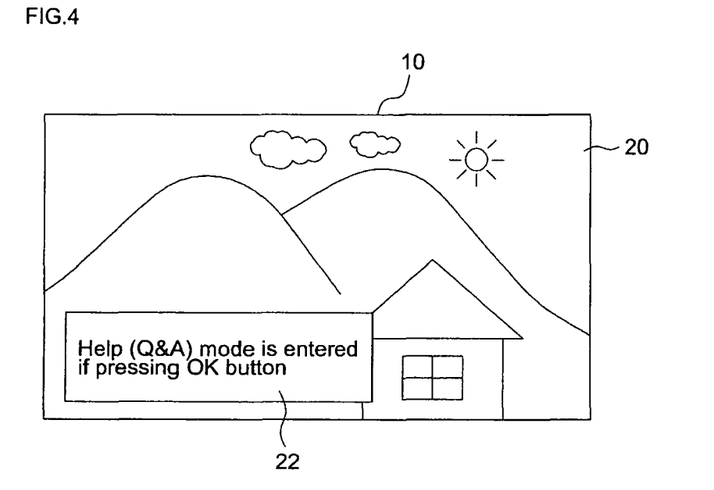
FIG. 4 is a diagram showing a display example of the display unit according to the embodiment.

First, as illustrated in FIG. 2, the control unit 4 allows the display unit 10 to display a captured image (hereinafter, referred to as a display image) 20 immediately after the image is captured by the user (step S10). Next, the control unit 4 determines whether up and down buttons of the cross operation key are operated by the user while the display image 20 is displayed on the display unit 10 (step S11). When it is determined that the up and down buttons have been operated in step S11 (step S11, Yes), the control unit 4, for example, displays an explanation (in FIG. 4, "help (Q&A) mode is entered if pressing the OK button") 22 for entering the help mode as illustrated in FIG. 4 on the display image 20 displayed on the display unit 10 (step S12).

Then, the control unit 4 determines whether the OK button has been pressed by the user (step S13). When it is determined that the OK button has been pressed in step S13 (step S13, Yes), the control unit 4 extracts factors (the ISO sensitivity, the shutter speed, the aperture value and the like as described above) that do not satisfy the predetermined condition in the display image 20 displayed on the display unit 10. Thereafter, the control unit 4 reads information on the image-capture state of the display image 20 based on the extracted factors, that is, problems regarding the noise, the color, the blur and the like as described above, from the recording unit 12, and for example, displays problems 24a to 24d as illustrated in FIG. 5, which have been read from the recording unit 12, on the display image 20 displayed on the display unit 10 (step S14).

Figure 5:
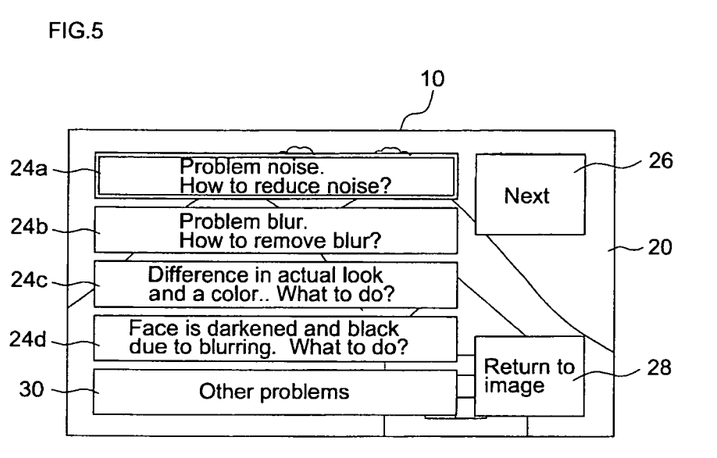
FIG. 5 is a diagram showing a display example of the display unit according to the embodiment.

In addition, when there are other problems read from the recording unit 12 (when there are problems other than the problems 24a to 24d), a "next" icon 26 illustrated in FIG. 5 is selected using the cross operation key and the like and the OK button is pressed to thereby display the problems other than the problems 24a to 24d on the display image 20 displayed on the display unit 10. When there are no more problems other than the problems read from the recording unit 12 (when there are the problems 24a to 24d only), the "next" icon 26 illustrated in FIG. 5 is not displayed. Furthermore, if a "return to image" icon 28 illustrated in FIG. 5 is selected using the cross operation key and the like and the OK button is pressed, the control unit 4 releases the help mode. Then, the control unit 4 stops displaying the problems 24a to 24d and the icons 26, 28 and 30 and displays only the display image 20 on the display unit 10. Furthermore, when a problem that is assumed by the user exists not in the problems (the problems 24a to 24d and the like) read with reference to the factors that do not satisfy the predetermined condition, the user selects an "other problems" icon 30 illustrated in FIG. 5.

Figure 6:
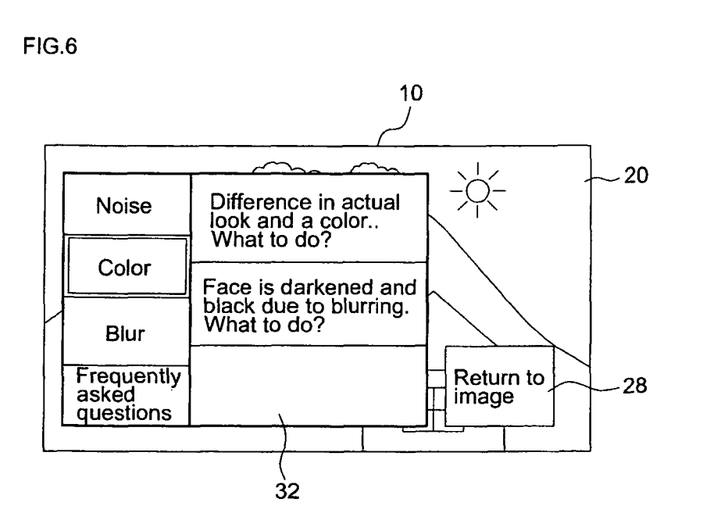
FIG. 6 is a diagram showing a display example of the display unit according to the embodiment.

Next, the control unit 4 determines whether the "other problems" icon 30 has been selected and the OK button has been pressed by the user (step S15). When it is determined that the "other problems" icon 30 has been selected in step S15 (step S15, Yes), the control unit 4 reads all the problems recorded on the recording unit 12. That is, the control unit 4 also reads problems based on factors having not been extracted, as well as the problems based on the extracted factors. Then, for example, as illustrated in FIG. 6, the control unit 4 displays a cluster 32, which includes all of the read problems, on the display image 20 displayed on the display unit 10 (step S16).

If any one of items (in FIG. 6, "noise", "color", "blur" and "frequently asked questions") displayed at the left side of the Q&A cluster 32 is selected by the user, all problems associated with the selected item are displayed at the right side of the Q&A cluster 32. For example, in FIG. 6, the item "color" is selected and all the problems associated with the item "color" such as "Difference in actual look and a color. What to do?" or "Face is darkened and black due to blurring. What to do?" are displayed at the right side of the Q&A cluster 32. In a similar manner, if the item "noise" is selected, all the problems associated with the item "noise" such as "Problem noise. How to reduce noise?" are displayed on the right side of the Q&A cluster 32. If the item "blur" is selected, all the problems associated with the item "blur" such as "Problem blurring. How to remove blur?" are displayed at the right side of the Q&A cluster 32.

Figure 7:
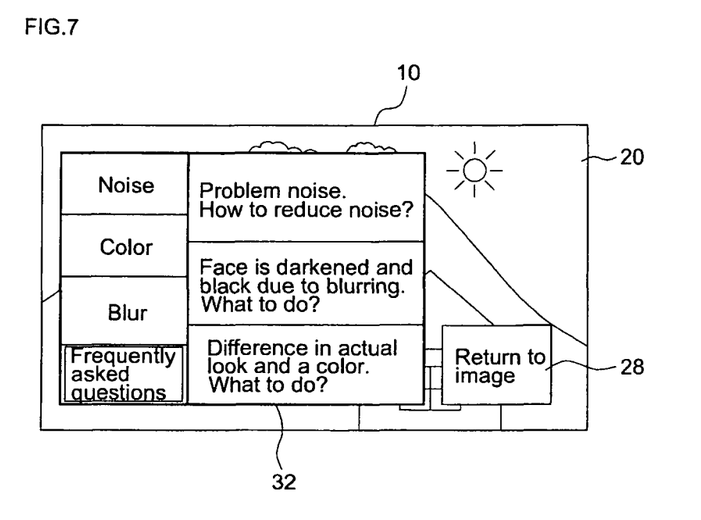
FIG. 7 is a diagram showing a display example of the display unit according to the embodiment.

The item "frequently asked questions" is, for example, as illustrated in FIG. 7, an item in which problems frequently selected by a novice are collected regardless of "noise", "color" and the like. In addition, an item in which problems frequently selected in the past by the user of the camera 2 are collected, for example, an item such as "your questions frequently asked", may be provided instead of "frequently asked questions", or may be additionally provided. That is, an item may be provided, in which problems corresponding to factors having setting values frequently changed in the past by the user are collected. It is noted that the number of times by which the setting values of each factor have been changed in the past is recorded on the recording unit 12, and a preset number of problems are displayed starting from problems corresponding to the setting values of each factor which have been frequently changed.

Furthermore, the problems displayed in the Q&A cluster 32 include not only the problems based on the factors that do not satisfy the predetermined condition in the display image 20 but also all the problems recorded on the recording unit 12. Consequently, it is possible to select a problem for which the camera 2 has determined that the image-capture state of the display image 20 is not problematic but the user has subjectively determined that the image-capture state of the display image 20 is problematic.

Next, the control unit 4 determines whether any one of the problems displayed on the display unit 10 (the Q&A cluster 32) has been selected by the user (step S17). When any one of the problems has been selected in step S17 (step S17, Yes), the control unit 4 determines whether there is a solution for the selected problem (step S18). That is, when the user has selected the problem in respect to which the camera 2 has determined that the image-capture state of the display image 20 is not problematic but the user has subjectively determined that the image-capture state of the display image 20 is problematic, a solution for the problem may not exist. Specifically, a description will be given with respect to a case in which the camera 2 has determined that a noise problem does not exist in the display image 20 but the user has selected the problem "Problem noise. How to reduce noise?". While it is necessary to lower the ISO sensitivity in order to reduce noise, when the display image 20 is an image obtained by using a person as an object and captured with the ISO sensitivity of 100, the ISO sensitivity may not be capable of a setting smaller than 100, that is, the ISO sensitivity may not be capable of lowering no more. Thus, when there is no setting value changeable in order to satisfy the predetermined condition, the control unit 4 determines that there is no solution for the problem of "Problem noise. How to reduce noise?" which has been selected by the user.

Figure 8:
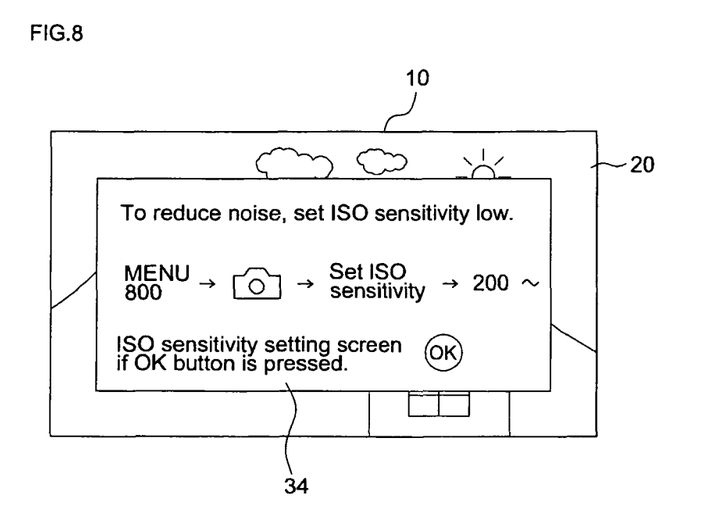
FIG. 8 is a diagram showing a display example of the display unit according to the embodiment.

When it is determined that there is a solution in step S18 (step S18, Yes), the control unit 4, for example, displays a screen 34 as illustrated in FIG. 8, which shows the solution for the problem selected in step S17, on the display image 20 displayed on the display unit 10 (step S19). In a similar manner, when the "other problems" icon 30 has not been selected in step S15 (step S15, No) and any one of the problems 24a to 24d has been selected, the control unit 4 displays the screen 34 (FIG. 8) showing the solution for the selected problem (step S19). In addition, the screen 34 displays the solution for the problem "Problem noise. How to reduce noise?".

It is noted that it may not be possible to further increase the shutter speed in order to reduce the blur, that is, there is no setting value changeable in order to satisfy the predetermined condition, for example, when the shutter speed is set to a maximum value within a settable range. Such a case occurs when although the camera 2 has determined that a blur problem does not exist in the display image 20, the user has selected the problem "Problem blur. How to remove blur?". In such a case, it is possible to determine that there is no solution for the problem in step S18; it is however possible to determine that there is a solution for the selected problem, for example, when there is another method (another solution) other than increasing the shutter speed such as increasing the ISO sensitivity or doing the capturing using a tripod. Then, the control unit 4 may allow the display unit 10 to display a screen showing another solution in step S19.

Furthermore, the screen 34 shows only the solution of lowering the ISO sensitivity in order to reduce noise. However, when capturing after lowering the ISO sensitivity, a problem may be caused by lowering the ISO sensitivity may occur, for example, a problem may occur in which shaking or darkness increases compared with the display image 20. Consequently, the screen 34 or an ISO sensitivity setting screen displayed after the OK button is pressed may display at least one of: the presence or absence of another factor (in such a case, the shutter speed) to be changed according to a change in a setting value of the ISO sensitivity; and a setting value of the factor to be changed. For example, the control unit 4 performs a flickering display of a character or a mark of the shutter speed that should be changed in conjunction, or display of a message such as "capturing is not possible at the same brightness without increasing the shutter speed", to thereby attract the user's intention.

Meanwhile, when it is determined that there is no solution in step S18 (step S18, No), the control unit 4 displays the fact that there is no solution on the display image 20 displayed on the display unit 10 (step S20). That is, it is necessary to lower the ISO sensitivity in order to reduce noise when the user has subjectively determined that there is noise in the image-capture state of the display image 20. However when there is no changeable setting value for example when the ISO sensitivity is set to a minimum value, the control unit 4 displays a message and the like that a changeable setting value is not available.

In addition, as illustrated in FIGS. 5, 6, 7 and the like, when a plurality of factors that do not satisfy the predetermined condition is extracted and a plurality of problems is displayed, the control unit 4 calculates the degree of separation (a difference from a threshold value) of each factor from the predetermined condition, decides the priorities of each factor based on the degree of separation of each factor, and controls the display status (e.g., an order), in which problems corresponding to each factor are displayed on the display unit 10, based on the decided priorities. Specifically, a high priority is given to a factor with a high degree of separation. A factor with a high priority is displayed at an upper position on a display screen of the display unit 10. For example, in FIG. 5, since the degree of separation, which is the difference between the setting value of the ISO sensitivity in the display image 20 and the threshold value, is higher than that of another factor such as the shutter speed, the priority of the ISO sensitivity is high and the problem of noise corresponding to the ISO sensitivity is displayed at the upper position on the display screen of the display unit 10.

Furthermore, when there is a plurality of factors with the same degree of separation, that is, a priority, the control unit 4 controls a display status of the problems based on the number of times by which the setting values of these factors have been changed in the past by the user. Specifically, problems corresponding to these factors are displayed on the display unit 10 in the descending order of the number of times by which the setting values of these factors have been changed in the past by the user. Alternatively, the problems corresponding to these factors may be displayed in the order of the Japanese syllabary, or in the order of storage on the recording unit 12. Also, problems corresponding to factors with a high priority may be enlarged and displayed at the center of the display screen as compared with other problems, instead of the upper position on the display screen of the display unit 10.

According to the camera of the present embodiment, a user can indicate problems of an image actually captured and thereby easily obtain solutions for the problems. That is, solutions for capturing a desired image can be obtained, for example, values set for operation targets can be obtained to thereby facilitate capturing of the desired image.

It is noted that in the above-described embodiment, information on the image-capture state of an image (i.e., the display image 20 displayed on the display unit 10) immediately after doing the capturing and setting value information on a capturing condition are displayed on the display unit 10. However, when other images which can be displayed on the display unit 10, for example, images recorded on the recording medium 8 are reproduced and displayed on the display unit 10, that is, images temporarily stored in a buffer memory are displayed on the display unit 10, information on the image-capture state of the images and setting value information on a capturing condition can be displayed on the display unit 10. This also applies to a through image in which information on the image-capture state of the through image based on extractable factors such as ISO sensitivity, the depth of field or scene recognition and setting value information on a capturing condition can be displayed on the display unit 10.

Furthermore, in the above-described embodiment, when a plurality of factors that do not satisfy the predetermined condition is extracted, the priority of each factor is decided based on the degree of separation of each factor. However, the priority of each factor may be decided based on the number of times that the setting values of each factor has been changed in the past by a user.

Furthermore, in the above-described embodiment, information on the image-capture state of the display image 20 and setting value information on a capturing condition are displayed on the display unit 10. However, only the information on the image-capture state of the display image 20 may be displayed on the display unit 10, or the setting value information on the capturing conditions of the display image 20 may be displayed on the display unit 10.

Figure 9:
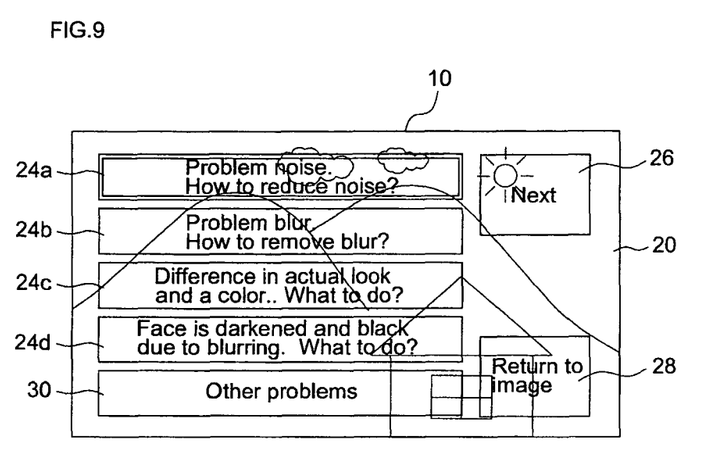
FIG. 9 is a diagram showing another display example of the display unit.

Furthermore, in the above-described embodiment, as illustrated in FIG. 5 to FIG. 8, the icons, the Q&A cluster and the like are displayed on the display image 20 in the state in which the display image 20 is not visible. However, for example, as illustrated in FIG. 9, the icons and the like can be displayed and superimposed on the display image 20. In other words, the icons and the like can be displayed in a state in which the display image 20 is visible. In such a case, it is possible to select problems and the like while viewing the display image 20.

Furthermore, in the above-described embodiment, a camera as an image processing apparatus has been described as an example. However, the present invention can also be applied to another image processing apparatus (e.g., a personal computer and the like) provided with a display unit for displaying an image, an extraction unit capable of extracting factors that do not satisfy the predetermined condition in an image displayed on the display unit, and a recording unit for storing information on problems of an image and solutions thereof.

In addition, in the above-described embodiment, the control unit 4 reads an image processing program for allowing the camera 2 to perform image processing from a memory (not shown) and the like to thereby execute the image processing program. That is, the image processing program used in the above-described embodiment causes the camera 2 to execute the steps of: acquiring the display image 20; extracting factors regarding the acquired display image that does not satisfy the predetermined condition in the acquired display image 20; and allowing the display unit 10 to display at least one of the information items on the image-capture state of the display image 20 based on the extracted factors and the setting value information on a capturing condition under which the factors satisfy the predetermined condition. Consequently, according to the image processing program used in the above-described embodiment, it is possible to easily obtain the setting value information on a capturing condition under which a desired image is captured.

Moreover, in the above-described embodiment, the image processing program stored in a memory and the like provided in the camera 2 is read and executed. However, the image processing program used in the above-described embodiment can be read from a portable recording medium where the image processing program is recorded, and executed.

The embodiments explained above have been described so that the present invention is understood more easily, and are not intended to limit the present invention. Therefore, in this meaning, the respective elements, which are disclosed in the respective embodiments described above, also include all of modifications of design and equivalents belonging to the technical scope of the present invention.

The invention claimed is:

1. An image processing apparatus including a storage unit and a recording medium, the image processing apparatus comprising:

an acquisition unit configured to acquire at least one of: an image stored in the storage unit, and an image recorded on the recording medium;

an extraction unit configured to perform scene recognition with respect to the at least one image and to extract a factor regarding the at least one image acquired by the acquisition unit, wherein the factor does not satisfy a predetermined condition;

a display unit configured to display at least one of: (i) information on an image-capture state of the at least one image based on the factor extracted by the extraction unit, and (ii) setting value information on a capturing condition under which the factor satisfies the predetermined condition; and a decision unit configured to: (1) calculate a degree of separation of each of the extracted factors from the predetermined condition in response to the extraction unit extracting a plurality of factors that do not satisfy the predetermined condition; and (2) decide a priority of each factor based on the degree of separation. wherein the display unit is configured to control a display status in which at least one of the information on an image-capture state and the setting value information on a capturing condition are displayed based on the priority of each factor decided by the decision unit.

2. The image processing apparatus according to claim 1, wherein
the decision unit decides a high priority for a factor with a high degree of separation among the plurality of extracted factors, and
the display unit displays a factor in order with high priority at an upper position on a display screen of the display unit.

3. The image processing apparatus according to claim 1, wherein
when a changeable setting value used to satisfy the predetermined condition is not present in the extracted factors, the display unit displays the absence of the setting value.

4. The image processing apparatus according to claim 1, wherein
when a changeable setting value used to satisfy the predetermined condition is not present in the extracted factors, the display unit displays a method of satisfying the predetermined condition by way of a method other than changing a setting value of the factor.

5. The image processing apparatus according to claim 1, further comprising a recording unit that records the number of times by which each setting value of each factor has been changed in the past, wherein
when there is a plurality of factors with the same priority decided by the decision unit, the display unit controls the display status of the information of each factor, based on the number of times recorded on the recording unit.

6. The image processing apparatus according to claim 1, wherein the display unit displays at least one of: information on an image-capture state of the image; and changeable setting value information of the factor even in relation to a factor not extracted by the extraction unit.

7. The image processing apparatus according to claim 1, wherein the display unit displays the information superimposed on the image.

8. The image processing apparatus according to claim 1, wherein the factor includes at least one of: ISO sensitivity; a shutter speed; an aperture value; a white balance; a grayscale value; a focal length of a lens; and presence or absence of emitted illumination light for capturing on an object when imaging the image.

9. An image processing apparatus including a storage unit and a recording medium, the image processing apparatus comprising:
an acquisition unit configured to acquire at least one of: an image stored in the storage unit, and an image recorded on the recording medium;

an extraction unit configured to perform scene recognition with respect to the at least one image and to extract a factor regarding the at least one image acquired by the acquisition unit, wherein the factor does not satisfy a predetermined condition; and a display unit configured to display at least one of: (i) information on an image-capture state of the at least one image based on the factor extracted by the extraction unit, and (ii) setting value information on a capturing condition under which the factor satisfies the predetermined condition; wherein when a value of the extracted factor is changed to a setting value satisfying the predetermined condition, the display unit displays at least one of a presence or an absence of another factor to be changed in conjunction with the change and the setting value of the another factor to be changed in conjunction with the change.

10. An image processing apparatus including a storage unit and a recording medium, the image processing apparatus comprising:
an acquisition unit configured to acquire at least one of an image stored in the storage unit, and an image recorded on the recording medium;

an extraction unit configured to perform scene recognition with respect to the at least one image and to extract a factor regarding the at least one image acquired by the acquisition unit, wherein the factor does not satisfy a predetermined condition;

a display unit configured to display at least one of (i) information on an image-capture state of the at least one image based on the factor extracted by the extraction unit. and (ii) setting value information on a capturing condition under which the factor satisfies the predetermined condition; and a recording unit configured to record the number of times by which each setting value of each factor has been changed in the past in response to the extraction unit extracting a plurality of factors that do not satisfy the predetermined condition; wherein the display unit controls a display status of at least one of the information on an image-capture state and the setting value information on a capturing condition based on the number of times recorded on the recording unit.

11. A non-volatile storage medium storing an image processing program, which is applied to an image processing apparatus including a display unit and processing at least one of an image stored in a storage unit and an image recorded on a recording medium, the image processing program comprising steps of:
acquiring the image;
performing scene recognition with respect to the image and extracting a factor regarding the acquired image that does not satisfy a predetermined condition;
causing the display unit to display at least one of: (i) information on an image capture state of the image based on the extracted factor and (ii) setting value information on a capturing condition under which the factor satisfies the predetermined condition; and
in response to extracting a plurality of factors that do not satisfy the predetermined condition, calculating a degree of separation of each of extracted factors from the predetermined condition, and deciding a priority of each factor based on the degree of separation; wherein the display unit controls a display status in which at least one of the information on an image-capture state and the setting value information on a capturing condition is displayed based on the decided priorities.

12. A non-transitory computer readable medium storing an image processing program, which is applied to an image processing apparatus including a display unit and processing at least one of an image stored in a storage unit and an image recorded on a recording medium, the image processing program comprising steps of:

acquiring the image;

performing scene recognition with respect to the image and extracting a factor regarding the acquired image that does not satisfy a predetermined condition; and causing the display unit to display at least one of: (i) information on an image-capture state of the image based on the extracted factor, and (ii) setting value information on a capturing condition under which the factor satisfies the predetermined condition; wherein when a value of the extracted factor is changed to a setting value satisfying the predetermined condition, the display unit displays at least one of a presence or an absence of another factor to be changed in conjunction with the change and the setting value of the another factor to be changed in conjunction with the change.

13. A non-transitory computer readable medium storing an image processing program, which is applied to an image processing apparatus including a display unit and processing at least one of an image stored in a storage unit and an image recorded on a recording medium, the image processing program comprising steps of:

acquiring the image;

performing scene recognition with respect to the image and extracting a factor regarding the acquired image that does not satisfy a predetermined condition;

causing the display unit to display at least one of: (i) information on an image-capture state of the image based on the extracted factor, and (ii) setting value information on a capturing condition under which the factor satisfies the predetermined condition; and recording that, when the step of extracting extracts a plurality of factors that do not satisfy the predetermined condition, records the number of times by which each setting value of each factor has been changed in the past; wherein the display unit controls a display status of at least one of the information on an image-capture state and the setting value information on a capturing condition based on the number of times recorded by the step of recording.

* * * * *